US012286899B2

(12) United States Patent
Cox et al.

(10) Patent No.: US 12,286,899 B2
(45) Date of Patent: Apr. 29, 2025

(54) TRAILING EDGE COOLING CIRCUIT

(71) Applicant: GE Infrastructure Technology LLC, Greenville, SC (US)

(72) Inventors: Brandon Lee Cox, Greenville, SC (US); David W. Weber, Simpsonville, SC (US)

(73) Assignee: GE Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 18/446,532

(22) Filed: Aug. 9, 2023

(65) Prior Publication Data

US 2025/0052161 A1   Feb. 13, 2025

(51) Int. Cl.
*F01D 5/18*  (2006.01)
*F02C 7/12*  (2006.01)

(52) U.S. Cl.
CPC ............... *F01D 5/18* (2013.01); *F02C 7/12* (2013.01); *F05D 2240/304* (2013.01); *F05D 2260/20* (2013.01)

(58) Field of Classification Search
CPC . F01D 5/18; F01D 5/187; F01D 5/186; F01D 5/189; F01D 5/20; F02C 3/04; F02C 3/12; F05D 2260/202; F05D 2260/20; F05D 2240/304
See application file for complete search history.

(56) References Cited

U.S. PATENT DOCUMENTS

| | | | | |
|---|---|---|---|---|
| 5,370,499 A | * | 12/1994 | Lee | F01D 5/186 416/97 R |
| 5,464,322 A | * | 11/1995 | Cunha | F01D 5/187 415/115 |
| 6,254,334 B1 | * | 7/2001 | LaFleur | F01D 25/12 415/115 |
| 7,131,818 B2 | * | 11/2006 | Cunha | F01D 5/189 415/115 |
| 8,398,370 B1 | * | 3/2013 | Liang | F01D 5/187 416/97 R |

(Continued)

FOREIGN PATENT DOCUMENTS

| | | | | |
|---|---|---|---|---|
| EP | 3828383 B1 | 8/2022 | | |
| ES | 2965889 T3 | * | 4/2024 | ............ F01D 5/141 |

OTHER PUBLICATIONS

European Search Report Corresponding to U.S. Appl. No. 24/191,382 on Jan. 17, 2025.

*Primary Examiner* — Craig Kim
(74) *Attorney, Agent, or Firm* — Dority & Manning, P.A.

(57) ABSTRACT

An airfoil includes a leading edge, a trailing edge, a pressure side wall, and a suction side wall. The pressure side wall and the suction side wall each extend between the leading edge and the trailing edge. A camber axis is defined halfway between the pressure side wall and the suction side wall. A cooling circuit is defined in the airfoil. The cooling circuit includes a trailing edge cooling circuit. The trailing edge cooling circuit has a pressure side channel that is disposed at least partially on a first side of the camber axis and a suction side channel that is disposed at least partially on a second side of the camber axis. The pressure side channel and the suction side channel each converge towards the trailing edge as the pressure side channel and the suction side channel extend towards the trailing edge.

19 Claims, 7 Drawing Sheets

(56) References Cited

U.S. PATENT DOCUMENTS

| | | | | |
|---|---|---|---|---|
| 8,500,401 | B1* | 8/2013 | Liang | F01D 5/186 |
| | | | | 415/115 |
| 8,562,295 | B1* | 10/2013 | Liang | F01D 5/189 |
| | | | | 29/889.7 |
| 8,770,920 | B2 | 7/2014 | Naik et al. | |
| 9,175,569 | B2 | 11/2015 | Bergholz, Jr. et al. | |
| 9,970,302 | B2 | 5/2018 | Lacy et al. | |
| 10,060,264 | B2* | 8/2018 | Moga | F01D 5/147 |
| 10,301,946 | B2 | 5/2019 | Weber et al. | |
| 11,598,215 | B1* | 3/2023 | Barker | F01D 5/181 |
| 11,655,717 | B2* | 5/2023 | Henderkott | F01D 11/122 |
| | | | | 228/245 |
| 11,814,965 | B2* | 11/2023 | Dyson | F01D 5/147 |
| 11,834,961 | B2* | 12/2023 | Barker | F01D 5/181 |
| 2008/0050241 | A1* | 2/2008 | Liang | F01D 5/189 |
| | | | | 416/97 R |
| 2009/0185903 | A1* | 7/2009 | Beeck | F01D 9/065 |
| | | | | 416/91 |
| 2010/0247329 | A1* | 9/2010 | Morgan | F01D 5/147 |
| | | | | 29/889.721 |
| 2011/0236221 | A1* | 9/2011 | Campbell | F01D 5/187 |
| | | | | 416/97 R |
| 2016/0362985 | A1* | 12/2016 | Lacy | F01D 9/041 |
| 2018/0023400 | A1* | 1/2018 | Jones | F01D 5/187 |
| | | | | 415/115 |
| 2018/0135424 | A1* | 5/2018 | Barker | F01D 9/065 |
| 2018/0163554 | A1* | 6/2018 | O'Leary | F01D 5/147 |
| 2018/0202295 | A1* | 7/2018 | Rhodes | F01D 5/20 |
| 2018/0230815 | A1* | 8/2018 | Jones | F01D 9/065 |
| 2019/0032493 | A1* | 1/2019 | Barker | F01D 5/189 |
| 2020/0049016 | A1* | 2/2020 | Barker | F01D 9/065 |
| 2024/0133298 | A1* | 4/2024 | Williamson | B23K 26/342 |

\* cited by examiner

TRAILING EDGE COOLING CIRCUIT

FIELD

The present disclosure relates generally to an airfoil for a turbomachine having a trailing edge cooling circuit. Particularly, the present disclosure is related to a trailing edge cooling circuit having separate pressure side and suction side cooling channels.

BACKGROUND

Turbomachines are utilized in a variety of industries and applications for energy transfer purposes. For example, a gas turbine engine generally includes a compressor section, a combustion section, a turbine section, and an exhaust section. The compressor section progressively increases the pressure of a working fluid entering the gas turbine engine and supplies this compressed working fluid to the combustion section. The compressed working fluid and a fuel (e.g., natural gas) mix within the combustion section and burn in a combustion chamber to generate high pressure and high temperature combustion gases. The combustion gases flow from the combustion section into the turbine section where they expand to produce work. For example, expansion of the combustion gases in the turbine section may rotate a rotor shaft connected, e.g., to a generator to produce electricity. The spent combustion gases then exit the turbine section via the exhaust section.

During operation of the turbomachine, various hot gas path components in the system are subjected to high temperature flows, which can stress the hot gas path components and shorten their useful life. Since higher temperature flows generally result in increased performance, efficiency, and power output of the turbomachine, the hot gas path components that are subjected to high temperature flows must be cooled to allow the gas turbine system to operate with flows at increased temperatures.

As the maximum local temperature of the hot gas path components approaches the melting temperature of the hot gas path components, forced air cooling becomes necessary. For this reason, airfoils of turbine rotor blades and stationary nozzles often require complex cooling schemes in which air, typically bleed air from the compressor section, is forced through internal cooling passages within the airfoil and then discharged through cooling holes at the airfoil surface to transfer heat from the hot gas path component.

The trailing edge region of the airfoil generally experiences higher thermal stresses than other regions of the airfoil. Traditional trailing edge regions often include a pin bank (or pin array), which includes a plurality of pins each extending directly between a pressure side wall and a suction side wall of the airfoil. However, issues exist with the use of pin banks. The pressure side wall often experiences higher temperatures than the suction side wall, and pin banks provide a direct connection between the pressure side and the suction side, such that heat is conductively transferred from the pressure side to the suction side. This is disadvantageous because it places undesired thermal stresses on the suction side wall from the pressure sidewall. Additionally, the pins in the pin bank may have relatively low durability or hardware life due to the high amount of thermal stresses experienced by the pins during operation of the airfoil. As such, an improved trailing edge cooling circuit that reduces thermal stress in the trailing edge region without the use of a pin bank is desired and would be appreciated in the art.

BRIEF DESCRIPTION

Aspects and advantages of the airfoils and turbomachines in accordance with the present disclosure will be set forth in part in the following description, or may be obvious from the description, or may be learned through practice of the technology.

In accordance with one embodiment, an airfoil is provided. The airfoil includes a leading edge, a trailing edge, a pressure side wall, and a suction side wall. The pressure side wall and the suction side wall each extend between the leading edge and the trailing edge. A camber axis is defined halfway between the pressure side wall and the suction side wall and extends between the leading edge and the trailing edge. A cooling circuit is defined in the airfoil. The cooling circuit includes a trailing edge cooling circuit. The trailing edge cooling circuit has a pressure side channel that is disposed at least partially on a first side of the camber axis and a suction side channel that is disposed at least partially on a second side of the camber axis. The pressure side channel and the suction side channel each converge towards the camber axis as the pressure side channel and the suction side channel extend towards the trailing edge.

In accordance with another embodiment, a turbomachine is provided. The turbomachine includes a compressor section, a combustion section disposed downstream of the compressor section, and a turbine section disposed downstream of the combustion section. A rotor blade is disposed in one of the combustion section or the turbine section. The rotor blade includes an airfoil. The airfoil includes a leading edge, a trailing edge, a pressure side wall, and a suction side wall. The pressure side wall and the suction side wall each extend between the leading edge and the trailing edge. A camber axis is defined halfway between the pressure side wall and the suction side wall and extends from the leading edge to the trailing edge. A cooling circuit is defined in the airfoil. The cooling circuit includes a trailing edge cooling circuit. The trailing edge cooling circuit has a pressure side channel that is disposed at least partially on a first side of the camber axis and a suction side channel that is disposed at least partially on a second side of the camber axis. The pressure side channel and the suction side channel each converge towards the camber axis as the pressure side channel and the suction side channel extend towards the trailing edge.

These and other features, aspects and advantages of the present airfoils and turbomachines will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present airfoils and turbomachines, including the best mode of making and using the present systems and methods, directed to one of ordinary skill in the art, is set forth in the specification, which makes reference to the appended figures, in which.

DETAILED DESCRIPTION

Reference now will be made in detail to embodiments of the present airfoils and turbomachines, one or more examples of which are illustrated in the drawings. Each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

The term "fluid" may be a gas or a liquid. The term "fluid communication" means that two or more areas defining a flow passage are joined to one another such that a fluid is capable of making the connection (i.e., flowing) between the areas specified.

As used herein, the terms "upstream" (or "forward") and "downstream" (or "aft") refer to the relative direction with respect to fluid flow in a fluid pathway. For example, "upstream" refers to the direction from which the fluid flows, and "downstream" refers to the direction to which the fluid flows. However, the terms "upstream" and "downstream" as used herein may also refer to a flow of electricity. The term "radially" refers to the relative direction that is substantially perpendicular to an axial centerline of a particular component, the term "axially" refers to the relative direction that is substantially parallel and/or coaxially aligned to an axial centerline of a particular component and the term "circumferentially" refers to the relative direction that extends around the axial centerline of a particular component.

Terms of approximation, such as "about," "approximately," "generally," and "substantially," are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values. When used in the context of an angle or direction, such terms include within ten degrees greater or less than the stated angle or direction. For example, "generally vertical" includes directions within ten degrees of vertical in any direction, e.g., clockwise or counter-clockwise.

The terms "coupled," "fixed," "attached to," and the like refer to both direct coupling, fixing, or attaching, as well as indirect coupling, fixing, or attaching through one or more intermediate components or features, unless otherwise specified herein. The terms "directly coupled," "directly fixed," "directly attached to," and the like mean that two components are joined in contact with one another and that no intermediate components or features are present.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "and/or" refers to a condition satisfied by any one of the following: A is true (or present) and B is false (or not present), A is false (or not present) and B is true (or present), and both A and B are true (or present).

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Figure 1:
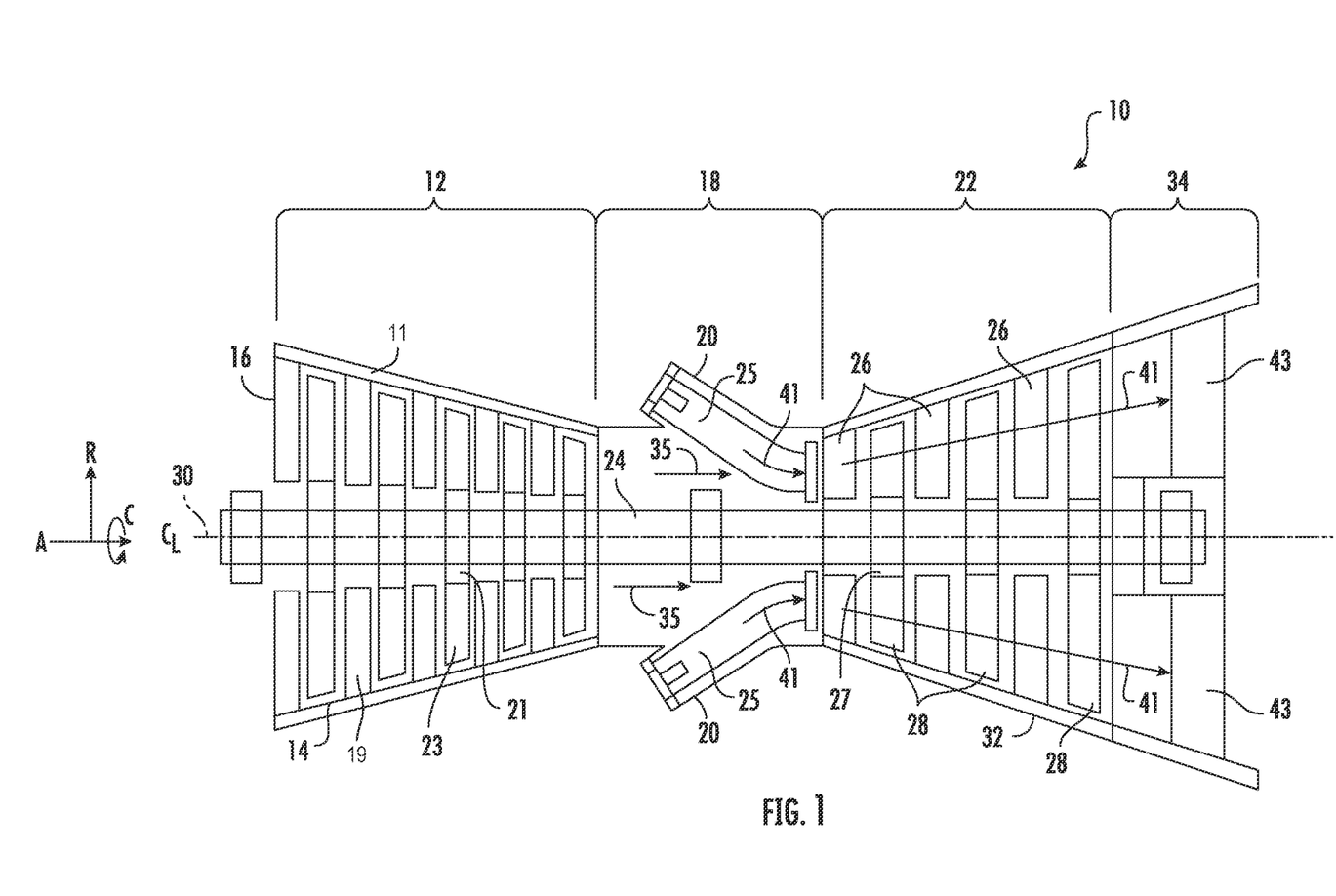
FIG. 1 is a schematic illustration of a turbomachine in accordance with embodiments of the present disclosure.

Referring now to the drawings, FIG. 1 illustrates a schematic diagram of one embodiment of a turbomachine, which in the illustrated embodiment is a gas turbine 10. Although an industrial or land-based gas turbine engine is shown and described herein, the present disclosure is not limited to an industrial or land-based gas turbine engine, unless otherwise specified in the claims. For example, the invention as described herein may be used in any type of turbomachine including, but not limited to, a steam turbine, an aircraft gas turbine, or a marine gas turbine.

As shown in FIG. 1, the gas turbine engine 10 generally includes a compressor section 12. The compressor section 12 includes a compressor 14. The compressor section 12 includes an inlet 16 that is disposed at an upstream end of the gas turbine 10. The gas turbine 10 further includes a combustion section 18 having one or more combustors 20 disposed downstream from the compressor section 12. The gas turbine 10 further includes a turbine section 22 (i.e., an expansion turbine) that is downstream from the combustion section 18. A shaft 24 extends generally axially through the gas turbine engine 10 and couples the compressor section 12 and the turbine section 22.

The compressor section 12 may generally include a plurality of rotor disks 21 and a plurality of rotor blades 23 extending radially outwardly from and connected to each rotor disk 21. Each rotor disk 21 in turn may be coupled to or form a forward portion of the shaft 24 that extends through the compressor section 12. The rotor blades 23 of the compressor section 12 may include turbomachine airfoils that define an airfoil shape (e.g., having a leading edge, a trailing edge, and side walls extending between the leading edge and the trailing edge). Additionally, the compressor section 12 includes stator vanes 19 disposed between the rotor blades 23. The stator vanes 19 may extend from and couple to a compressor casing 11.

The turbine section 22 may generally include a plurality of rotor disks 27 and a plurality of rotor blades 28 extending radially outwardly from and being interconnected to each rotor disk 27. Each rotor disk 27 in turn may be coupled to or form an aft portion of the shaft 24 that extends through the turbine section 22. The turbine section 22 further includes an outer casing 32 that circumferentially surrounds the aft portion of the shaft 24 and the rotor blades 28. The turbine section 22 may include stator vanes or stationary nozzles 26 extending radially inward from the outer casing 32. The rotor blades 28 and stator vanes 26 may be arranged in alternating fashion in stages along an axial centerline 30 of gas turbine 10. Both the rotor blades 28 and the stator vanes 26 may include turbomachine airfoils that define an airfoil shape (e.g., having a leading edge, a trailing edge, and side walls extending between the leading edge and the trailing edge).

In operation, ambient air or other working fluid is drawn into the inlet 16 of the compressor 14 and is progressively compressed to provide a compressed air 35 to the combustion section 18. The compressed air 35 flows into the combustion section 18 and is mixed with fuel to form a combustible mixture. The combustible mixture is burned within a combustion chamber 25 of the combustor 20, thereby generating combustion gases 41 that flow from the combustion chamber 25 into the turbine section 22. Energy (kinetic and/or thermal) is transferred from the combustion gases 41 to the rotor blades 28, causing the shaft 24 to rotate and produce mechanical work. The spent combustion gases 41 (also called "exhaust gases") exit the turbine section 22 and flow through the exhaust diffuser 34 across a plurality of struts or main airfoils 43 that are disposed within the exhaust diffuser 34.

The gas turbine engine 10 may define a cylindrical coordinate system having an axial direction A extending along the axial centerline 30, a radial direction R perpendicular to the axial centerline 30, and a circumferential direction C extending around the axial centerline 30.

Figure 2:
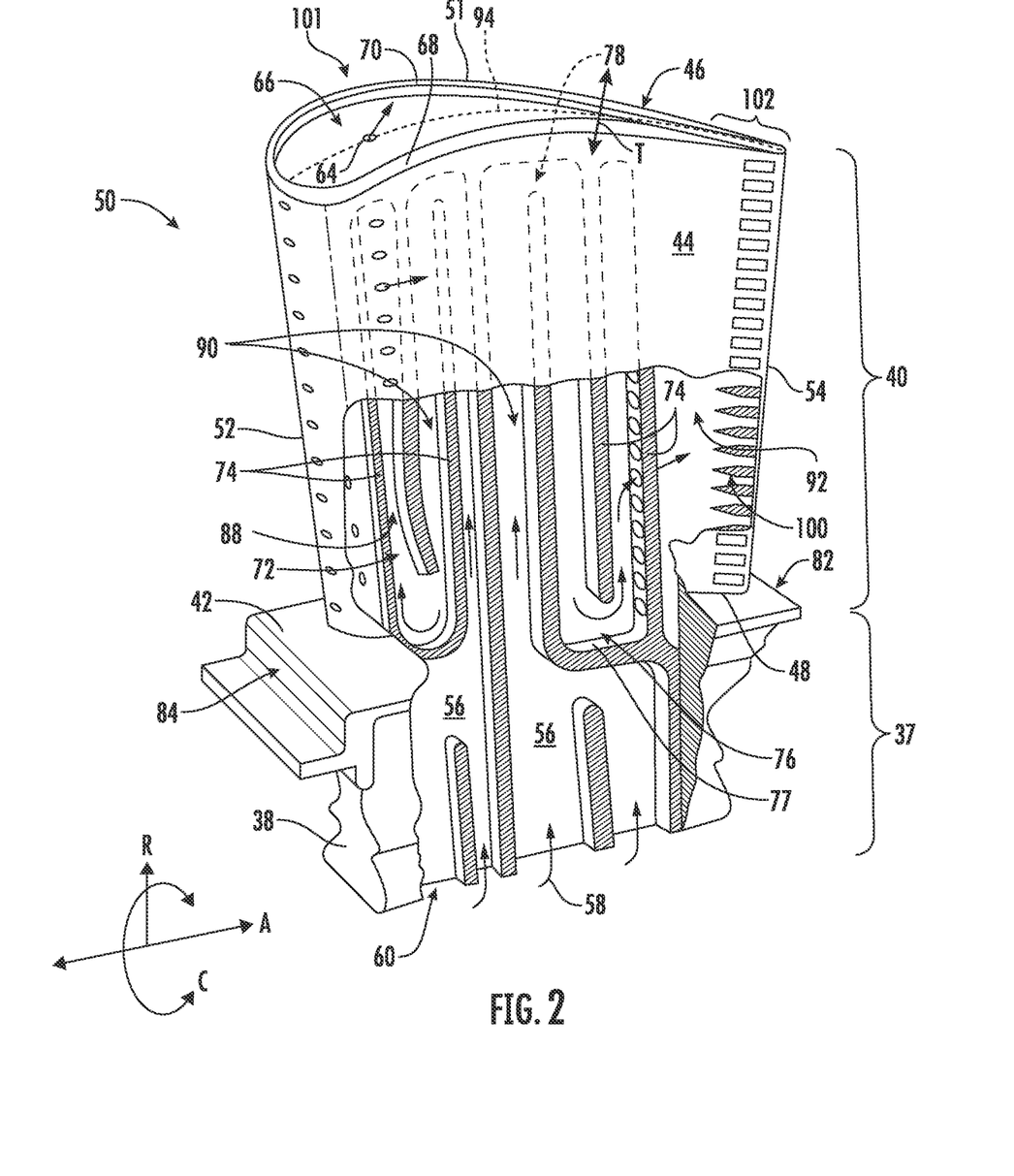
FIG. 2 illustrates a perspective, partial cut-away, view of a rotor blade in accordance with embodiments of the present disclosure.

FIG. 2 provides a perspective, partial cut-away view of an exemplary rotor blade 50. The rotor blade 50 may be the rotor blade 23 disposed in the compressor section 12 or the rotor blade 28 disposed in the turbine section 22, which are described above with reference to FIG. 1. As shown in FIG. 2, the rotor blade 50 generally includes a shank portion 37 and an airfoil 40 that extends outwardly from the shank portion 37. For example, the shank portion 37 may include a mounting portion 38 and a platform 42, and the airfoil 40 may extend along the radial direction R from the platform 42. The platform 42 generally serves as the radially inward boundary for the gases flowing through the gas turbine engine 10 (e.g., air flowing through the compressor section 12 or hot gases 41 flowing through the hot gas path of the turbine section 22, as shown in FIG. 1). The platform 42 extends along the axial direction A from a leading face 84 to a trailing face 82. As shown in FIG. 2, the mounting portion 38 of the shank portion 37 may extend radially inwardly from the platform 42 and may include a root structure, such as a dovetail, configured to interconnect or secure the rotor blade 50 to a rotor disk 21, 27 (FIG. 1). In exemplary embodiments, the rotor blade 50 may be a turbine rotor blade (such as the rotor blade 28 described above with reference to FIG. 1), which may benefit from the present cooling circuit(s).

The airfoil 40 includes a pressure side wall 44 and an opposing suction side wall 46. The pressure side wall 44 and the suction side wall 46 extend substantially radially outwardly from the platform 42 in span from a root 48 of the airfoil 40, which may be defined at an intersection between the airfoil 40 and the platform 42, to a tip 51 of the airfoil 40. The pressure side wall 44 is connected to the suction side wall 46 at a leading edge 52 of the airfoil 40 and a trailing edge 54 downstream of the leading edge 52, and the airfoil 40 thus extends between the leading edge 52 and the trailing edge 54. The pressure side wall 44 generally comprises an aerodynamic, concave external surface of the airfoil 40. Similarly, the suction side wall 46 may generally define an aerodynamic, convex external surface of the airfoil 40. The tip 51 is disposed radially opposite the root 48. As such, the tip 51 may generally define the radially outermost portion of the rotor blade 50 and, thus, may be configured to be positioned adjacent to a stationary shroud or seal (not shown) of the gas turbine engine 10. The tip 51 may include a tip cavity 66 or a tip shroud (not shown).

As shown in FIG. 2, the rotor blade 50 may be at least partially hollow, e.g., the rotor blade 50 may include a cooling circuit 72 defined therein. The cooling circuit 72 may include a plurality of cooling passages 56 (shown partially in dashed lines in FIG. 2), which may be circumscribed within the rotor blade 50 for routing a coolant 58 through the airfoil 40 between the pressure side wall 44 and the suction side wall 46, thus providing convective cooling thereto. The cooling passages 56 may be at least partially defined by and between a plurality of ribs 74. The ribs 74 extend partially through the cooling circuit 72 generally along the radial direction R, e.g., as illustrated in FIG. 2. The ribs 74 may extend fully through the cooling circuit 72 between the pressure side wall 44 and the suction side wall 46. The plurality of ribs 74 may thereby partition the cooling circuit 72 and at least partially form or define the cooling passages 56. For example, each rib 74 may radially terminate near one of a root turn 76 or a tip turn 78. The root turn 76 may be partially defined by a floor 77, which defines the radially inward most boundary of the root turn 76.

The coolant 58 may include a portion of the compressed air from the compressor section 12 (FIG. 1) and/or steam or any other suitable gas or other fluid for cooling the airfoil 40. One or more cooling passage inlets 60 are disposed along the rotor blade 50. In some embodiments, one or more cooling passage inlets 60 are formed within, along or by the mounting portion 38. The cooling passage inlets 60 are in fluid communication with at least one corresponding cooling passage 56. A plurality of coolant outlets 64 may be in fluid communication with the tip cavity 66. Each cooling passage 56 is in fluid communication with at least one of the coolant outlets 64. In some embodiments, the tip cavity 66 may be at least partially surrounded by a pressure side tip rail 68 and a suction side tip rail 70.

As may be seen in FIG. 2, the cooling passages 56 extend within each of the shank portion 37 and the airfoil 40. For example, the cooling passages 56 may extend between the shank portion 37 and the airfoil 40, e.g., from the shank portion 37 to the airfoil 40, such as from the one or more cooling passage inlets 60 in the shank portion 37 to the at least one coolant outlet 64 in the tip 51 of the airfoil 40.

The airfoil 40 may define a camber axis 94 halfway between the pressure side wall 44 and the suction side wall 46. The camber axis 94 may extend between (and intersect) the leading edge 52 and the trailing edge 54. That is, the camber axis 94 may be an imaginary line that extends from the leading edge 52 to the trailing edge 54, and the camber axis 94 may be the average curvature of the pressure side wall 44 and the suction side wall 46. The camber axis 94 may be curved and/or contoured to correspond with the curve of the pressure side wall 44 and the suction side wall 46. A transverse direction T may be defined orthogonally with respect to the camber axis 94.

The cooling passages 56 may include a leading edge passage 88, one or more intermediate passages 90, and a trailing edge passage 92. The leading edge passage 88 may be defined by the leading edge 52 and a rib 74. The leading edge passage 88 may be the cooling passage 56 that is disposed closest to the leading edge 52. Each of the intermediate passages 90 may be defined between two ribs 74. The intermediate passages 90 may be disposed between the leading edge passage 88 and the trailing edge passage 92. The trailing edge passage 92 may be defined by a rib 74 and a trailing edge cooling circuit 100.

In many embodiments, the airfoil 40 may include a main body region 101 and a trailing edge region 102. The main body region 101 and the trailing edge region 102 may extend the entire span of the airfoil 40 (e.g., radially between the root 48 and the tip 51). The main body region 101 may extend along the camber axis 94 between the leading edge 52 and the trailing edge region 102, and the trailing edge region 102 may extend along the camber axis 94 from the main body region 101 to the trailing edge 54. Additionally, the trailing edge region 102 may extend along the camber axis 94 from the trailing edge 54 to between about 10% and about 40% of an entire length of the camber axis 94, or such as between about 10% and about 35% of the entire length of the camber axis 94, or such as between about 10% and about 30% of the entire length of the camber axis 94, or such as between about 10% and about 25% of the entire length of the camber axis 94, or such as between about 10% and about 20% of the entire length of the camber axis 94. As should be appreciated, the trailing edge region 102 may generally be exposed to higher thermal stresses during operation of the gas turbine 10. The trailing edge cooling circuit 100 may be disposed in the trailing edge region 102, in order to provide convective cooling to the trailing edge region 102, thereby increasing the hardware life of the airfoil 40.

Figure 3:
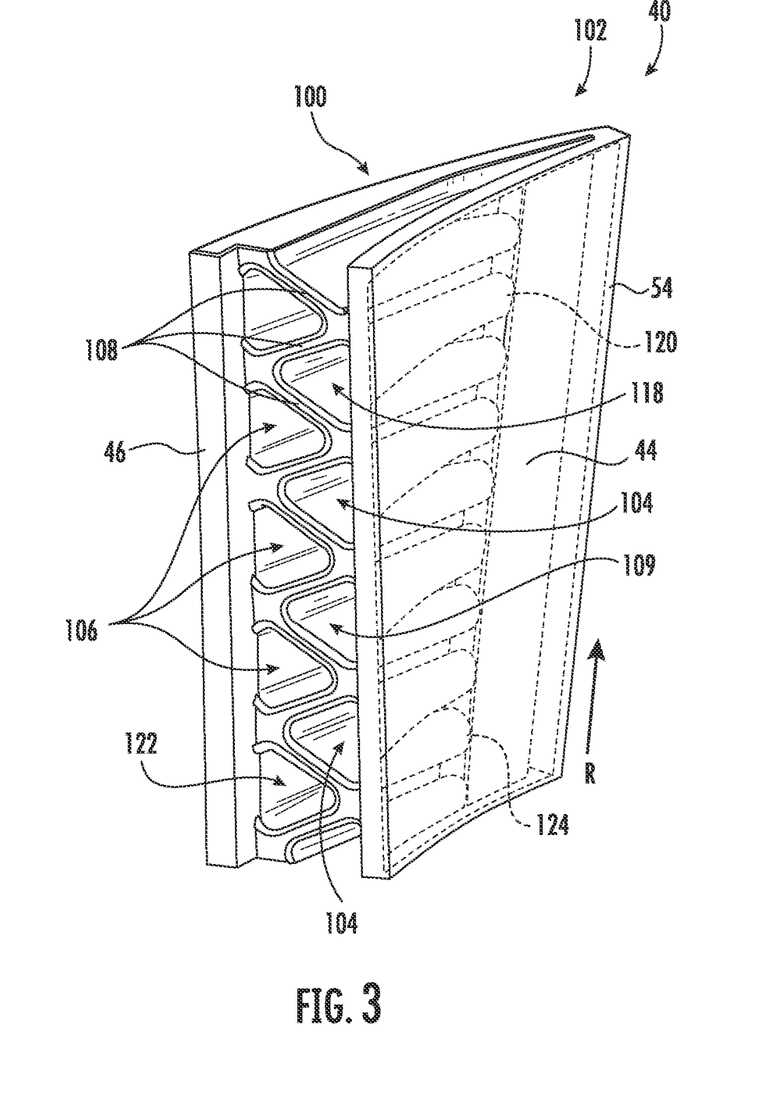
FIG. 3 illustrates a cross-sectional perspective view of a portion of a trailing edge region of an airfoil, which includes a trailing edge cooling circuit, in accordance with embodiments of the present disclosure.

Referring now to FIG. 3, a cross-sectional perspective view of a trailing edge region 102 of the airfoil 40 having a trailing edge cooling circuit 100 is illustrated in accordance with embodiments of the present disclosure. As shown, the trailing edge cooling circuit 100 includes a plurality of pressure side channels 104 and a plurality of suction side channels 106. The pressure side channels 104 and the suction side channels 106 may be radially spaced apart from one another. For example, a plurality of shared walls 108 may radially separate the plurality of pressure side channels 104 and the plurality of suction side channels 106. Particularly, the pressure side channel 104 and the suction side channel 106 may each be partially defined by a shared wall 108 of the plurality of shared walls 108.

For example, each shared wall 108 may define a pressure side channel 104 of the plurality of pressure side channels 104 and a neighboring suction side channel 106 of the plurality of suction side channels 106. Each shared wall 108 of the plurality of shared walls 108 may extend generally oblique to the radial direction R between an interior of the suction side wall 46 and an interior of the pressure side wall 44. In some embodiments, each shared wall 108 may slope radially outwardly as the shared wall 108 extends between one of the pressure side wall 44 or the suction side wall 46 to the other of the pressure side wall 44 or the suction side wall 46.

Each pressure side channel 104 of the plurality of pressure side channels 104 may extend from a pressure side inlet 118 to a pressure side outlet 120. Likewise, each suction side channel 106 of the plurality of suction side channels 106 may extend from a suction side inlet 122 to a suction side outlet 124. As shown in FIG. 3, the pressure side channel 104 may converge in cross-sectional area as the pressure side channel 104 extends between the pressure side inlet 118 and the pressure side outlet 120. Additionally, the suction side channel 106 may converge in cross-sectional area between the suction side inlet 122 and the suction side outlet 124. Particularly, both a radial length and transverse length (e.g., perpendicular to the camber axis 94) of the channels 106, 108 may converge (or decrease) as the channels 106, 108 extend towards the trailing edge 54.

Figure 4:
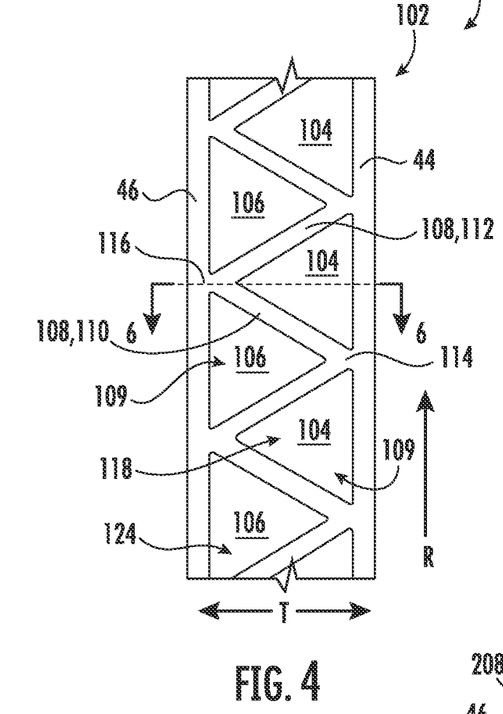
FIG. 4 illustrates a cross-sectional view, in a radial-transverse plane, of a trailing edge region of an airfoil having a trailing edge cooling circuit in accordance with embodiments of the present disclosure.

Referring now to FIG. 4, a cross-sectional view of the trailing edge region 102 of the airfoil 40 having the trailing edge cooling circuit 100 in a radial-transverse plane is illustrated in accordance with embodiments of the present disclosure. As shown, the plurality of shared walls 108 may include a plurality of first shared walls 110 and a plurality of second shared walls 112. The plurality of first shared walls 110 may each extend obliquely to the radial direction R from the pressure side wall 44 to the suction side wall 46, and the plurality of second shared walls 112 may extend obliquely to the radial direction R from the suction side wall 46 to the pressure side wall 44. Each of the first shared walls 110 may intersect (at a first intersection point 114) one of the second shared walls 112 at the pressure side wall 44 and may intersect (at a second intersection point 116) a different one of the second shared walls 112 at the suction side wall 46. Stated otherwise, each of the second shared walls 112 may intersect (at the first intersection point 114) one of the first shared walls 110 at the pressure side wall 44 and may intersect (at the second intersection point 116) a different one of the first shared walls 110 at the suction side wall 46.

The pressure side channel 104 may be collectively defined by a first shared wall 110 of the plurality of first shared walls 110, a second shared wall 112 of the plurality of second shared walls 112, and an interior of the pressure side wall 44. Similarly, the suction side channel 106 may be collectively defined by a first shared wall 110 of the plurality of first shared walls 110, a second shared wall 112 of the plurality of second shared walls 112, and an interior of the suction side wall 46.

In some embodiments, as shown in FIG. 4, the pressure side channel 104 and the suction side channel 106 may define a triangle-shaped area 109 (e.g., cross-sectional area). Particularly, the pressure side channel 104 and the suction side channel 106 may define a triangle-shaped area 109 in the radial-transverse plane. Referring back to FIG. 3 briefly, the pressure side channel 104 may converge in cross-sectional area between the pressure side inlet 118 and the pressure side outlet 120. Similarly, the suction side channel 106 may converge in cross-sectional area between the suction side inlet 122 and the suction side outlet 124. For example, the triangle shaped area 109 may converge (or continually decrease) as the pressure side channel 104 and the suction side channel 106 extend from the respective inlet 118, 122 to the respective outlet 120, 124.

Figure 5:
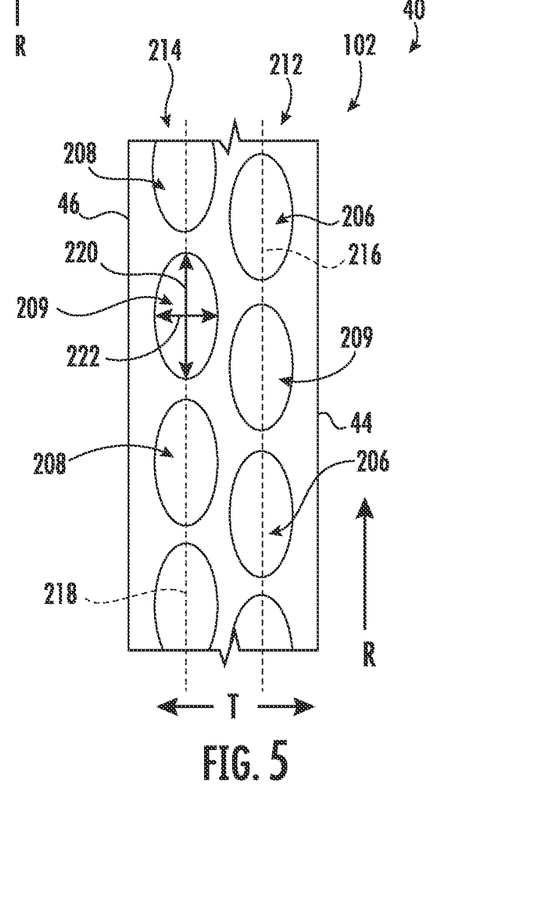
FIG. 5 illustrates a cross-sectional view, in a radial-transverse plane, of a trailing edge region of an airfoil having a trailing edge cooling circuit in accordance with embodiments of the present disclosure.

Referring now to FIG. 5, a cross-sectional view of the trailing edge region 102 of the airfoil 40 having the trailing edge cooling circuit 100 in a radial-transverse plane is illustrated in accordance with another embodiment of the present disclosure. As shown, the trailing edge cooling circuit 100 may include a plurality of pressure side channels 206 and a plurality of suction side channels 208, which are defined by conduits (not separately numbered). Particularly, the pressure side channels 206 and the suction side channels 208 may be arranged in radial rows 212, 214. For example, the plurality of pressure side channels 206 may be disposed in a pressure side radial row 212, and the plurality of suction side channels 208 may be disposed in a suction side row 214. Particularly, the plurality of pressure side channels 206 may each be centered along a first radial line 216 proximate to the pressure side wall 44 (e.g., closer to the pressure side wall 44 than the suction side wall 46). Similarly, the plurality of suction side channels 208 may each be centered along a second radial line 218 proximate to the suction side wall 46 (e.g., closer to the suction side wall 46 than the pressure side wall 44).

Additionally, as shown in FIG. 5, each of the pressure side channels 206 and the suction side channels 208 may define an oval-shaped cross-sectional area 209. Particularly, the oval-shaped area 209 may be defined in the radial-transverse plane, and the oval-shaped area 209 may include a major axis 220 and a minor axis 222. The major axis 220 may be the longest dimension of the oval-shaped area 209, and the minor axis 222 may be the shortest dimension of the oval-shaped area 209. The major axis 220 may be parallel to the radial direction R, and the minor axis 222 may be parallel to the transverse direction T.

In many embodiments, as shown in FIG. 5, the plurality of suction side channels 208 may be radially staggered relative to the plurality of pressure side channels 206, such that each suction side channel 208 radially overlaps with at least one (or two) pressure side channels 206 of the plurality of pressure side channels 206. For example, each suction side channel 208 may be disposed radially between two pressure side channels 206 of the plurality of pressure side channels 206. Similarly, each pressure side channel 206 may be disposed radially between two suction side channels 208 of the plurality of suction side channels 208.

Figure 6:
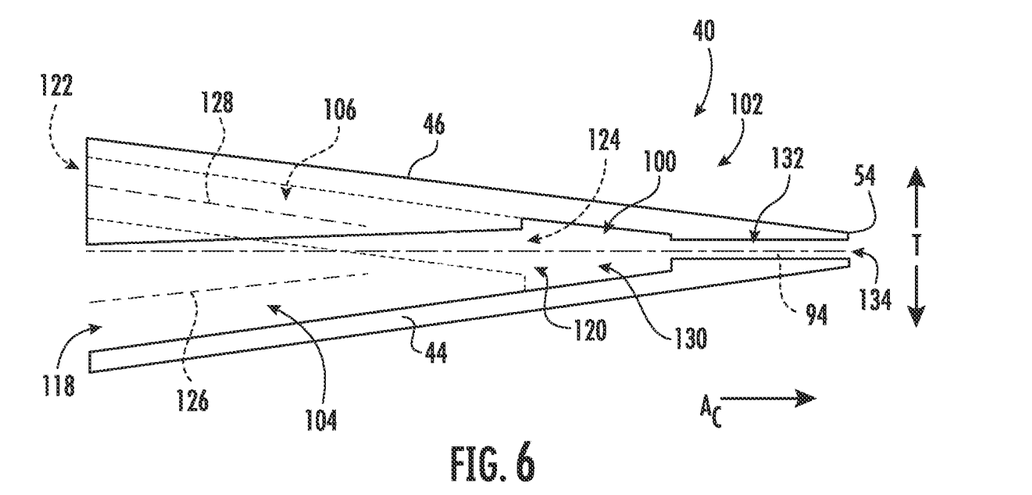
FIG. 6 illustrates a cross-sectional view of the trailing edge region of the airfoil of FIG. 4 from along the line 6-6 in accordance with embodiments of the present disclosure.

Referring now to FIG. 6, a cross-sectional view of the trailing edge region 102 of the airfoil 40, which includes a trailing edge cooling circuit 100, from along the line 6-6 shown in FIG. 4 is illustrated in accordance with embodiments of the present disclosure. The trailing edge region 102 of the airfoil 40 may include a portion of the suction side wall 46 and a portion of the pressure side wall 44, and the camber axis 94 extends between the suction side wall 46 and the pressure side wall 44 through the trailing edge region 102 to the trailing edge 54. An axial direction $A_C$ may extend along the camber axis 94, and the transverse direction T may be perpendicular to the axial direction $A_C$. As shown in FIG. 6, the trailing edge cooling circuit 100 may include a pressure side channel 104 and a suction side channel 106 (shown in phantom).

The pressure side channel 104 may be disposed at least partially on a first side (e.g., a first transverse side) of the camber axis 94, and the suction side channel 106 may be disposed at least partially on a second side (e.g., a second transverse side) of the camber axis 94. The first side may be transversely between the camber axis 94 and the pressure side wall 44, and the second side may be transversely between the camber axis 94 and the suction side wall 46. Particularly, a majority (e.g., more than about 50%, or such as more than about 65%, or such as more than 75%, or such as more than 90%) of the pressure side channel 104 may be disposed on the first side of the camber axis 94. Similarly, a majority (e.g., more than about 50%, or such as more than about 65%, or such as more than 75%, or such as more than 90%) of the suction side channel 106 may be disposed on the second side of the camber axis 94.

In exemplary embodiments, as shown in FIG. 6, the pressure side channel 104 may extend between a pressure side inlet 118 and a pressure side outlet 120 and along a pressure side centerline 126 on the first side of the camber axis 94. Similarly, the suction side channel 106 extends between a suction side inlet 122 and a suction side outlet 124 and along a suction side centerline 128 on the second side of the camber axis 94. In such embodiments, the pressure side centerline 126 may converge towards the camber axis 94 between the pressure side inlet 118 and the pressure side outlet 120, and the suction side centerline 128 may converge towards the camber axis 94 between the suction side inlet 122 and the suction side outlet 124. Thus, the pressure side channel 104 and the suction side channel 106 may be said to converge towards the trailing edge 54 as the pressure side channel 104 and the suction side channel 106 extend towards the trailing edge 54.

In many embodiments, the pressure side channel 104 and the suction side channel 106 may each extend to, and be in direct fluid communication with, a common plenum 130. For example, the pressure side channel 104 may extend from the pressure side inlet 118 to the pressure side outlet 120 at the common plenum 130. Similarly, the suction side channel 106 may extend from the suction side inlet 122 to the suction side outlet 124 at the common plenum 130. The common plenum 130 may be centered on the camber axis 94 (such that a centerline of the common plenum 130 is aligned with the camber axis 94). In exemplary embodiments, as shown in FIGS. 3 and 6, the pressure side channel 104 and the suction side channel 106 may be disposed with respective centerlines 126, 126 in different radial (span-wise) planes and thus may converge on (intersect with) the common plenum 130 via outlets 120, 124 located in different radial planes.

In exemplary embodiments, one or more exit channels 132 may extend from the common plenum 130 to corresponding outlet(s) 134 at the trailing edge 54. The one or more exit channels 132 may extend directly along the camber axis 94 from the common plenum 130 to the trailing edge 54, in order to exhaust coolant from the trailing edge cooling circuit 100 (and the entire cooling circuit 72).

Figure 7:
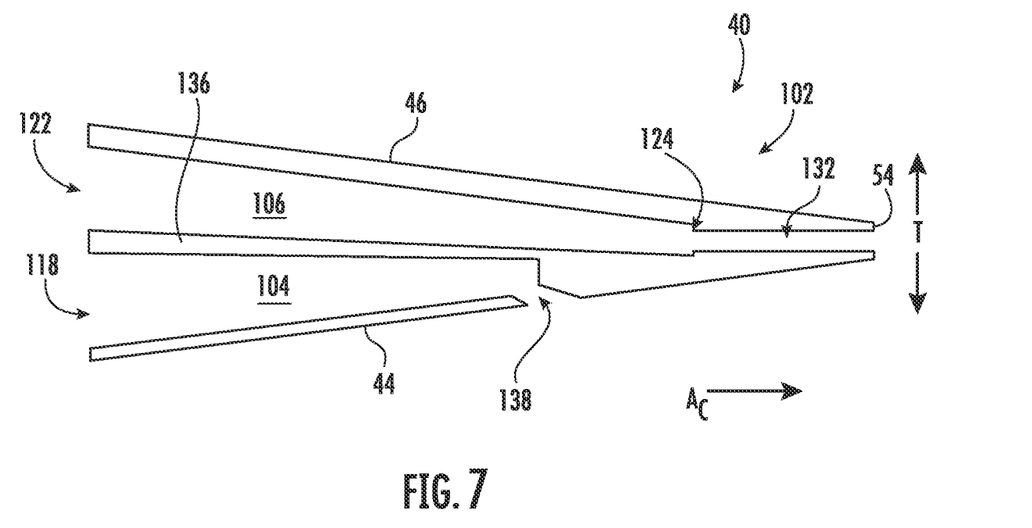
FIG. 7 illustrates a cross-sectional view of a trailing edge region of an airfoil in accordance with embodiments of the present disclosure.

Referring now to FIG. 7, a cross-sectional view of the trailing edge region 102 of the airfoil 40 is illustrated in accordance with another embodiment of the present disclosure. As shown, the pressure side channel 104 and the suction side channel 106 may be defined at least partially in the same axial-transverse plane. In such embodiments, a dividing wall 136 may separate, and partially define, the pressure side channel 104 and the suction side channel 106. The dividing wall 136 may extend generally axially and be disposed transversely between the suction channel 106 and the pressure side channel 104. Additionally, the dividing wall 136 may extend at least partially along the camber axis 94. Other walls defining the channels 104, 106 (e.g., walls spanning between the pressure side wall 44 and the suction side wall 46 in various radial planes) are not illustrated.

In various embodiments, the pressure side channel 104 may terminate forward (or upstream) of the trailing edge 54, such that the suction side channel 106 extends axially beyond the pressure side channel 104. For example, the suction side channel 106 may extend from the suction side inlet 122 to an exit channel 132 at the trailing edge 54, and the pressure side channel 104 may extend from a pressure side inlet 118 to a pressure side exit channel 138. The pressure side exit channel 138 may extend from the pressure side channel 104 to an outlet on the pressure side wall 44. The pressure side exit channel 138 may be generally oblique to the camber axis 94 (and the pressure side wall 44) in the axial-transverse plane, such that the pressure side exit channel 138 advantageously exhausts coolant at an angle for film cooling the pressure side wall 44 upstream of the trailing edge 54.

Figure 8:
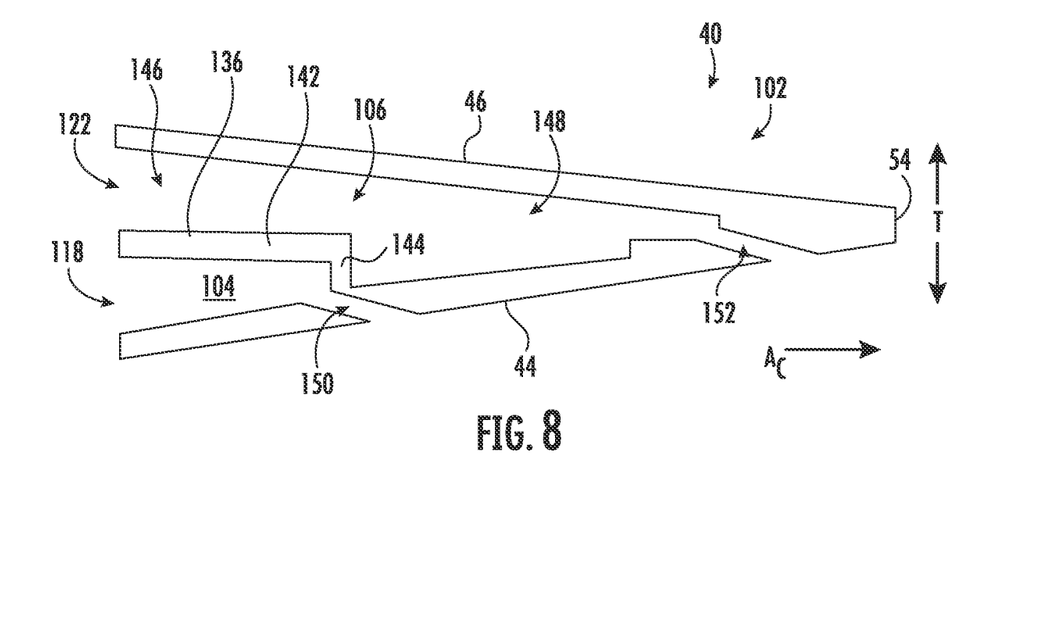
FIG. 8 illustrates a cross-sectional view of a trailing edge region of an airfoil in accordance with embodiments of the present disclosure.
Figure 9:
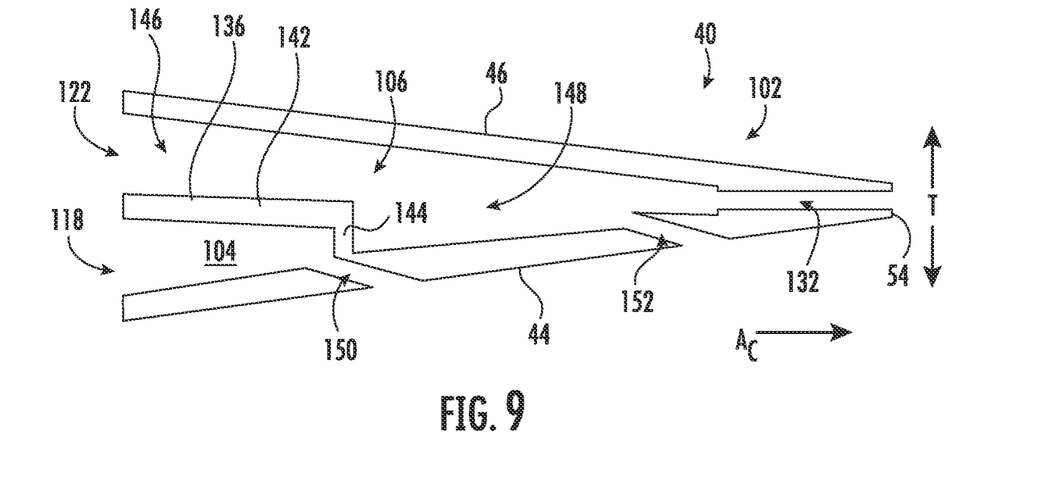
FIG. 9 illustrates a cross-sectional view of a trailing edge region of an airfoil in accordance with embodiments of the present disclosure.

Referring now to FIGS. 8 and 9, a cross-sectional view of the trailing edge region 102 of the airfoil 40 is illustrated in accordance with embodiments of the present disclosure. As shown, the dividing wall 136 may include an axial portion 142 and a transverse portion 144. The pressure side channel 104 may terminate forward (or upstream) of the trailing edge 54 at the transverse portion 144 of the dividing wall 136, such that the suction side channel 106 extends axially beyond the pressure side channel 104. In such embodiments, the suction side channel 106 may include a first portion 146 and a second portion 148. The first portion 146 may extend from the suction side inlet 122 to the transverse portion 144 of the dividing wall 136, and the second portion 148 may extend from the transverse portion 144 of the dividing wall 136 to an exit channel 132 and/or 152. The first portion 146 may have a smaller transverse width than the second portion 148. The first portion 146 may be defined (transversely) between the suction side wall 46 and the dividing wall 136, and the second portion 148 may be defined (transversely) between the pressure side wall 44 and the suction side wall 46.

As shown in FIGS. 8 and 9, both the pressure side channel 104 and the suction side channel 106 may include separate pressure side exit channels. For example, the pressure side channel 104 may extend to a first pressure side exit channel 150, and the suction side channel 106 may include a second pressure side exit channel 152 disposed downstream of the first pressure side exit channel 150. The first pressure side exit channel 150 may extend generally obliquely (relative to the camber axis 94 and the pressure side wall 44) from a terminal end of the pressure side channel 104 to an outlet on the pressure side wall 44.

In some embodiments, as shown in FIG. 8, the second pressure side exit channel 152 may extend generally obliquely (relative to the camber axis 94 and the pressure side wall 44) from a terminal end of the suction side channel 106 to an outlet on the pressure side wall 44. In such embodiments, the second pressure side exit channel 152 may be the only exit channel to the suction side channel 106 (e.g., the trailing edge cooling circuit 100 may not include an exit channel at the trailing edge). In other embodiments, as shown in FIG. 9, the suction side channel 106 may further include a trailing edge exit channel 154 downstream of the second pressure side exit channel 152 with respect to the flow of coolant (from left to right) through the trailing edge cooling circuit 100.

Figure 10:
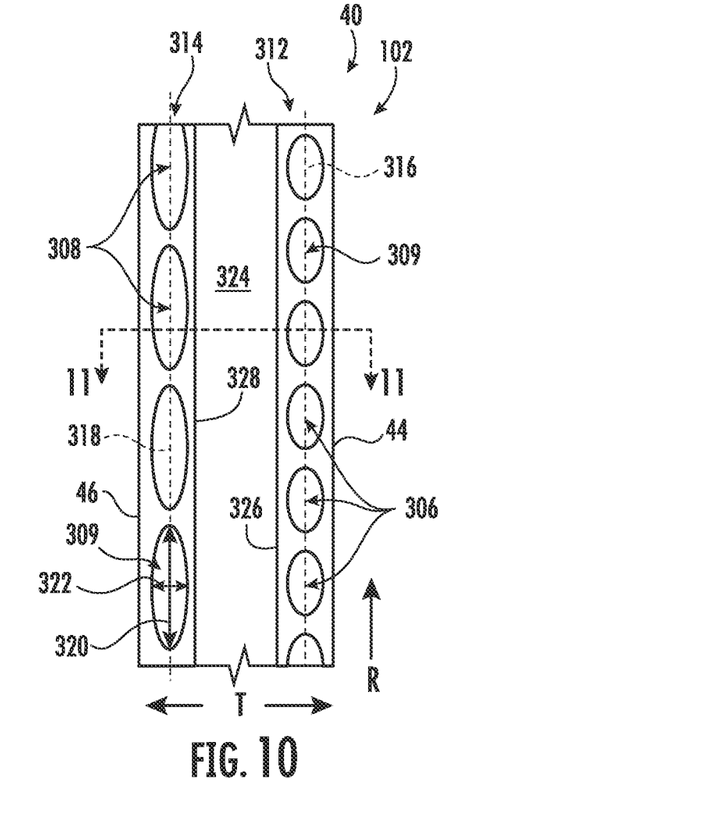
FIG. 10 illustrates a cross-sectional view, in a radial-transverse plane, of a trailing edge region of an airfoil having a trailing edge cooling circuit in accordance with embodiments of the present disclosure.

Referring now to FIG. 10, a cross-sectional view of the trailing edge region 102 of the airfoil 40 having the trailing edge cooling circuit 100 in a radial-transverse plane is illustrated in accordance with another embodiment of the present disclosure. As shown, the trailing edge cooling circuit 100 may include a plurality of pressure side channels 306 and a plurality of suction side channels 308. Particularly, the pressure side channels 306 and the suction side channels 308 may be arranged in radial rows 312, 314. For example, the plurality of pressure side channels 306 may be disposed in a pressure side radial row 312, and the plurality of suction side channels 308 may be disposed in a suction side radial row 314. Particularly, the plurality of pressure side channels 306 may each be centered along a first radial line 316 proximate to the pressure side wall 44 (e.g., closer to the pressure side wall 44 than the suction side wall 46). Similarly, the plurality of suction side channels 308 may each be centered along a second radial line 318 proximate to the suction side wall 46 (e.g., closer to the suction side wall 46 than the pressure side wall 44).

Additionally, as shown in FIG. 10, each of the pressure side channels 306 and the suction side channels 308 may define an oval-shaped area 309. Particularly, the oval-shaped area 309 may be defined in the radial-transverse plane, and the oval-shaped area 309 may include a major axis 320 and a minor axis 322. The major axis 320 may be the longest dimension of the oval-shaped area 309, and the minor axis 322 may be the shortest dimension of the oval-shaped area 309. The major axis 320 may be parallel to the radial direction R, and the minor axis 322 may be parallel to the transverse direction T.

In many embodiments, as shown in FIG. 10, the plurality of suction side channels 308 may be radially staggered relative to the plurality of pressure side channels 306, such that each suction side channel 308 radially overlaps with at least one (or two) pressure side channels 306 of the plurality of pressure side channels 306. Additionally, as shown in FIG. 10, an area (such as a cross-sectional area in the radial-transverse plane) of one of the pressure side channel 306 or the suction side channel 308 may be larger than an area (such as a cross-sectional area in the radial-transverse plane) of the other of the pressure side channel 306 or the suction side channel 308. For example, the oval-shaped area 309 of one of the pressure side channels 306 or the suction side channels 308 may be larger than the oval-shaped area 309 of the other of the pressure side channels 306 or the suction side channels 308. In the illustrated exemplary embodiment, the major axis 320 and the minor axis 322 of the oval-shaped area 309 of the suction side channels 308 may be longer than the major axis 320 and the minor axis 322 of the oval-shaped area 309 of the pressure side channels 306. In this way, the flow of cooling air to the pressure side channels 306 and/or the suction side channels 308 may be metered based on cooling needs by adjusting the size of the channels 306, 308.

In various embodiments, the airfoil 40 may define dead space 324 that is disposed between the pressure side channels 306 and the suction side channels 308. In some embodiments, the dead space 324 may be a cavity that extends radially the entire span of the airfoil 40 (e.g., from the root 48 to the tip 51). In other embodiments, the dead space 324 may be a cavity that extends only a portion of the span of the airfoil 40. Particularly, a first dividing wall 326 may extend radially through the airfoil 40 and partially define the dead space 324 and one or more of the pressure side channels 306. A second dividing wall 328 may extend radially through the airfoil 40 and partially define the dead space 324 and one or more of the suction side channels 308. That is, the dividing walls 326, 328 may be spaced apart from one another in the transverse direction T, such that the dead space 324 is defined between the first dividing wall 326 and the second dividing wall 328.

Figure 11:
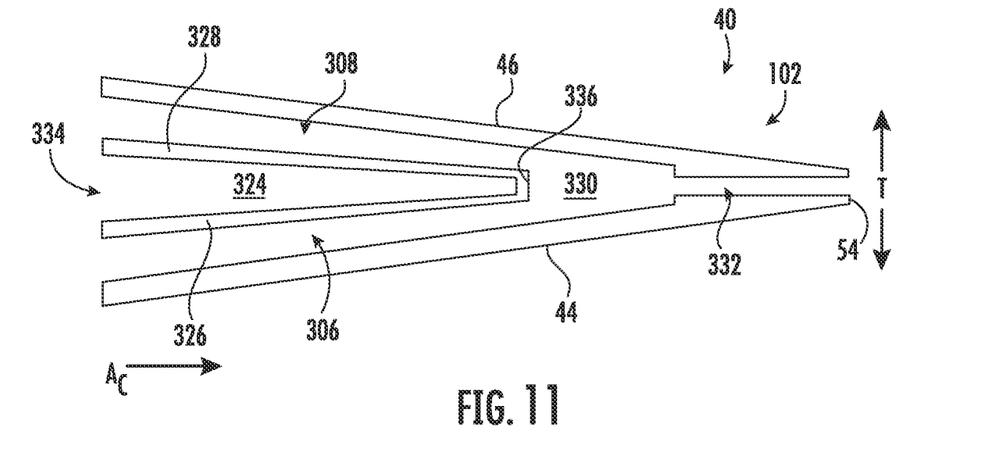
FIG. 11 illustrates a cross-sectional view of the trailing edge region of the airfoil of FIG. 10 from along the line 11-11 in accordance with embodiments of the present disclosure.

Referring now to FIG. 11, a cross-sectional view of the trailing edge region 102 of the airfoil 40, which includes a trailing edge cooling circuit 100, from along the line 11-11 shown in FIG. 10 is illustrated in accordance with embodiments of the present disclosure. As shown, the pressure side channel 306 may be defined by the first dividing wall 326 and by an interior of the pressure side wall 44. The suction side channel 308 may be defined by the second dividing wall 328 and by an interior of the suction side wall 46. The channels 308 may each extend to a common plenum 330, and an exit channel 332 may extend from the common plenum 330 to the trailing edge 54. The dead space 324 may include an open end 334 and a closed end 336, and the closed end 336 may partially define the common plenum 330. In this way, air flowing into the dead space 324 does not immediately exit the airfoil 40 (e.g., from the dead space 324). Rather, all air entering the dead space 324 must eventually exit the dead space 324 and enter one of the channels 306, 308.

As used herein, "in cooling proximity" refers to a relationship between a cooling channel (such as the suction side channel 106 or the pressure side channel 104) and a respective surface along which a majority of the cooling channel is located (e.g., the suction side wall 46 and the pressure side wall 44), such that the temperature of the respective surface is decreased by the fluid flowing through the cooling channel. For example, the pressure side channels 104 may be in cooling proximity with the pressure side wall 44 but not the suction side wall 46. Similarly, the suction side channels 106 may be in cooling proximity with the suction side wall 46 but not the pressure side wall 44.

The trailing edge cooling circuit 100 described herein advantageously reduces peak thermal stresses experienced in the trailing edge region 102 by spreading the thermal stresses across the entire structure. For example, the shared walls and/or the staggered cooling channels conductively spread the thermal stress experienced by the airfoil 40 throughout the structure of the trailing edge region 102, which is then convectively cooled by coolant flowing through the cooling channels 104, 106. This advantageously increases the overall robustness and durability of the airfoil 40.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims, or if they include equivalent structural elements with insubstantial differences from the literal language of the claims.

Further aspects of the invention are provided by the subject matter of the following clauses:

An airfoil comprising: a leading edge; a trailing edge; a pressure side wall and a suction side wall each extending between the leading edge and the trailing edge, wherein a camber axis is defined halfway between the pressure side wall and the suction side wall; and a cooling circuit defined in the airfoil, the cooling circuit having a trailing edge cooling circuit comprising a pressure side channel and a suction side channel, the pressure side channel disposed in cooling proximity to the pressure side wall and the suction side channel disposed in cooling proximity to the suction side wall.

The airfoil as in any preceding clause, wherein the pressure side channel is disposed at least partially on a first side of the camber axis and the suction side channel is disposed at least partially on a second side of the camber axis, and wherein the pressure side channel and the suction side channel each converge towards the trailing edge as the pressure side channel and the suction side channel extend towards the trailing edge.

The airfoil as in any preceding clause, wherein the pressure side channel and the suction side channel are partially defined by a shared wall disposed between the pressure side wall and the suction side wall.

The airfoil as in any preceding clause, wherein the pressure side channel extends between a pressure side inlet and a pressure side outlet and along a pressure side centerline on a first side of the camber axis, and wherein the suction side channel extends between a suction side inlet and a suction side outlet and along a suction side centerline on a second side of the camber axis.

The airfoil as in any preceding clause, wherein the pressure side centerline converges towards the camber axis between the pressure side inlet and the pressure side outlet, and wherein the suction side centerline converges towards the camber axis between the suction side inlet and the suction side outlet.

The airfoil as in any preceding clause, wherein the pressure side channel and the suction side channel are radially spaced apart from one another.

The airfoil as in any preceding clause, wherein the pressure side channel converges in cross-sectional area between the pressure side inlet and the pressure side outlet, wherein the suction side channel converges in cross-sectional area between the suction side inlet and the suction side outlet.

The airfoil as in any preceding clause, wherein the pressure side channel and the suction side channel each extend to a common plenum.

The airfoil as in any preceding clause, wherein one or more exit channels extend from the common plenum to the trailing edge.

The airfoil as in any preceding clause, wherein the pressure side channel extends to a pressure side exit channel.

The airfoil as in any preceding clause, wherein the pressure side exit channel is a first pressure side exit channel, and wherein the suction side channel includes a second pressure side exit channel disposed downstream of the first pressure side exit channel.

The airfoil as in any preceding clause, wherein the pressure side channel and the suction side channel define one of a triangle-shaped or oval-shaped cross-sectional area.

The airfoil as in any preceding clause, wherein the pressure side channel is one of a plurality of pressure side channels, wherein the suction side channel is one of a plurality of suction side channels, and wherein the plurality of suction side channels is radially staggered relative to the plurality of pressure side channels such that each suction side channel radially overlaps with at least one pressure side channel of the plurality of pressure side channels.

The airfoil as in any preceding clause, wherein the airfoil further defines a dead space disposed between the pressure side channel and the suction side channel.

The airfoil as in any preceding clause, wherein an area of one of the pressure side channel or the suction side channel is larger than an area of the other of the pressure side channel or the suction side channel.

A turbomachine comprising: a compressor section; a combustion section disposed downstream of the compressor section; and a turbine section disposed downstream of the combustion section, wherein a rotor blade is disposed in one of the combustion section or the turbine section, the rotor blade having an airfoil that comprises: a leading edge; a trailing edge; a pressure side wall and a suction side wall each extending between the leading edge and the trailing edge, wherein a camber axis is defined halfway between the pressure side wall and the suction side wall; and a cooling circuit defined in the airfoil, the cooling circuit having a trailing edge cooling circuit comprising a pressure side channel and a suction side channel, the pressure side channel disposed in cooling proximity to the pressure side wall and the suction side channel disposed in cooling proximity to the suction side wall.

The turbomachine as in any preceding clause, wherein the pressure side channel is disposed at least partially on a first side of the camber axis and the suction side channel is disposed at least partially on a second side of the camber axis, and wherein the pressure side channel and the suction side channel each converge towards the trailing edge as the pressure side channel and the suction side channel extend towards the trailing edge.

The turbomachine as in any preceding clause, wherein the pressure side channel and the suction side channel are partially defined by a shared wall disposed between the pressure side wall and the suction side wall.

The turbomachine as in any preceding clause, wherein the pressure side channel extends between a pressure side inlet and a pressure side outlet and along a pressure side centerline on a first side of the camber axis, and wherein the suction side channel extends between a suction side inlet and a suction side outlet and along a suction side centerline on a second side of the camber axis.

The turbomachine as in any preceding clause, wherein the pressure side centerline converges towards the camber axis between the pressure side inlet and the pressure side outlet, and wherein the suction side centerline converges towards the camber axis between the suction side inlet and the suction side outlet.

What is claimed is:

1. An airfoil defining a camber axis, a transverse direction orthogonal to the camber axis, and a radial direction orthogonal to the transverse direction, the airfoil comprising:
a leading edge;
a trailing edge;
a pressure side wall and a suction side wall each extending between the leading edge and the trailing edge, wherein a camber axis is defined halfway between the pressure side wall and the suction side wall; and
a cooling circuit defined in the airfoil, the cooling circuit having a trailing edge cooling circuit comprising a pressure side channel and a suction side channel, the pressure side channel disposed in cooling proximity to the pressure side wall and the suction side channel disposed in cooling proximity to the suction side wall;
wherein the pressure side channel converges in cross-sectional area from a pressure side inlet to a pressure side outlet adjacent the trailing edge;
wherein the suction side channel converges in cross-sectional area from a suction side inlet to a suction side outlet adjacent the trailing edge; and
wherein the pressure side inlet overlaps with the suction side inlet in both the radial direction and the transverse direction.

2. The airfoil as in claim 1, wherein the pressure side channel is disposed at least partially on a first side of the camber axis and the suction side channel is disposed at least partially on a second side of the camber axis, and wherein the pressure side channel and the suction side channel each converge towards the trailing edge as the pressure side channel and the suction side channel extend towards the trailing edge.

3. The airfoil as in claim 1, wherein the pressure side channel and the suction side channel are partially defined by a shared wall disposed between the pressure side wall and the suction side wall.

4. The airfoil as in claim 1, wherein the pressure side channel extends between the pressure side inlet and the pressure side outlet along a pressure side centerline on a first side of the camber axis, and wherein the suction side channel extends between the suction side inlet and the suction side outlet along a suction side centerline on a second side of the camber axis.

5. The airfoil as in claim 4, wherein the pressure side centerline converges towards the camber axis between the pressure side inlet and the pressure side outlet, and wherein the suction side centerline converges towards the camber axis between the suction side inlet and the suction side outlet.

6. The airfoil as in claim 1, wherein the pressure side channel and the suction side channel are radially spaced apart from one another.

7. The airfoil as in claim 1, wherein the pressure side channel and the suction side channel each extend to a common plenum.

8. The airfoil as in claim 7, wherein one or more exit channels extend from the common plenum to the trailing edge.

9. The airfoil as in claim 1, wherein the pressure side channel extends to a pressure side exit channel.

10. The airfoil as in claim 9, wherein the pressure side exit channel is a first pressure side exit channel, and wherein the suction side channel includes a second pressure side exit channel disposed downstream of the first pressure side exit channel.

11. The airfoil as in claim 1, wherein the pressure side channel and the suction side channel define one of a triangle-shaped or oval-shaped cross-sectional area.

12. The airfoil as in claim 1, wherein the pressure side channel is one of a plurality of pressure side channels, wherein the suction side channel is one of a plurality of suction side channels, and wherein the plurality of suction side channels is radially staggered relative to the plurality of pressure side channels such that each suction side channel radially overlaps with at least one pressure side channel of the plurality of pressure side channels.

13. The airfoil as in claim 1, wherein the airfoil further defines a dead space disposed between the pressure side channel and the suction side channel.

14. The airfoil as in claim 1, wherein an area of one of the pressure side channel or the suction side channel is larger than an area of the other of the pressure side channel or the suction side channel.

15. A turbomachine comprising:
a compressor section;
a combustion section disposed downstream of the compressor section; and
a turbine section disposed downstream of the combustion section, wherein a rotor blade is disposed in one of the combustion section or the turbine section, the rotor blade having an airfoil that defines a camber axis, a transverse direction orthogonal to the camber axis, and a radial direction orthogonal to the transverse direction, the airfoil comprises:
a leading edge;
a trailing edge;
a pressure side wall and a suction side wall each extending between the leading edge and the trailing edge, wherein a camber axis is defined halfway between the pressure side wall and the suction side wall; and
a cooling circuit defined in the airfoil, the cooling circuit having a trailing edge cooling circuit comprising a pressure side channel and a suction side channel, the pressure side channel disposed in cooling proximity to the pressure side wall and the suction side channel disposed in cooling proximity to the suction side wall;

wherein the pressure side channel converges in cross-sectional area from a pressure side inlet to a pressure side outlet adjacent the trailing edge;

wherein the suction side channel converges in cross-sectional area from a suction side inlet to a suction side outlet adjacent the trailing edge;

wherein the pressure side inlet overlaps with the suction side inlet in both the radial direction and the transverse direction.

16. The turbomachine as in claim 15, wherein the pressure side channel is disposed at least partially on a first side of the camber axis and the suction side channel is disposed at least partially on a second side of the camber axis, and wherein the pressure side channel and the suction side channel each converge towards the trailing edge as the pressure side channel and the suction side channel extend towards the trailing edge.

17. The turbomachine as in claim 15, wherein the pressure side channel and the suction side channel are partially defined by a shared wall disposed between the pressure side wall and the suction side wall.

18. The turbomachine as in claim 15, wherein the pressure side channel extends between the pressure side inlet and the pressure side outlet along a pressure side centerline on a first side of the camber axis, and wherein the suction side channel extends between the suction side inlet and the suction side outlet along a suction side centerline on a second side of the camber axis.

19. The turbomachine as in claim 18, wherein the pressure side centerline converges towards the camber axis between the pressure side inlet and the pressure side outlet, and wherein the suction side centerline converges towards the camber axis between the suction side inlet and the suction side outlet.

* * * * *